Nov. 27, 1962 W. E. BOWERS 3,066,253
METHODS AND APPARATUS FOR MEASUREMENT
Filed Oct. 16, 1956 2 Sheets-Sheet 1

INVENTOR.
WILLIAM E. BOWERS
BY
HIS ATTORNEY

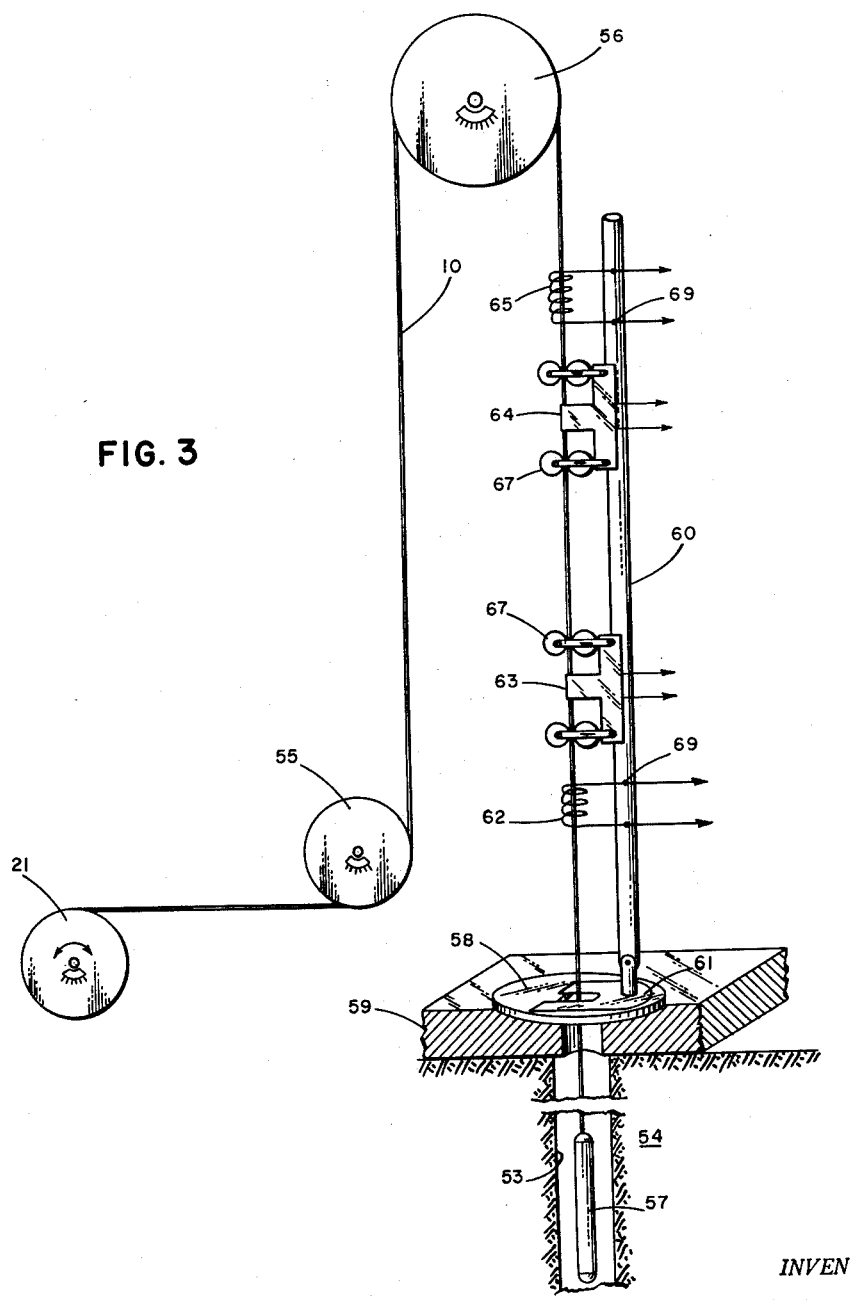

3,066,253
METHODS AND APPARATUS FOR MEASUREMENT
William E. Bowers, Houston, Tex., assignor, by mesne assignments, to Schlumberger Well Surveying Corporation, Houston, Tex., a corporation of Texas
Filed Oct. 16, 1956, Ser. No. 616,219
19 Claims. (Cl. 324—34)

The present invention relates to methods and apparatus for measurement of cable, wire or like elongated articles and, more particularly, to methods and apparatus for placing magnetic marks on such articles at intervals therealong.

In many well services, a tool is lowered at the end of a cable or wire for positioning at a given depth or for movement through a range of depths. To provide an accurate determination of these depths, it is common practice to continuously measure the net travel of the cable or wire into and out of the well by means of a measuring wheel and, in addition, to detect magnetic marks placed on the cable or wire at calibrated intervals as a check upon the accuracy of the measuring wheel. For purposes of accurate placement of perforating tools, for correlation of various logs of a well, and the like, determinations of depth with an accuracy as great as one part in ten thousand may be required and a corresponding accuracy in the placement of magnetic marks is therefore necessary.

In one widely used method of placing magnetic marks, cable is spooled under a constant tension and stopped at 100 foot intervals laid off with measuring tape to permit a workman to run a permanent magnet around the cable. While this method has provided magnetic marks which are strong enough to resist erasure by mechanical shock and stray magnetic fields to which the cable may be subjected, the procedure is tedious and subject to human error. Apparatus has been proposed heretofore for placing strong magnetic marks on the cable, using mark detecting and recording heads. As the cable moves from the recording head to the detecting head, a strong mark is detected and simultaneously another strong mark is recorded. Although the recording and detecting heads may be accurately spaced at a calibrated interval, it is found that inherent, cumulative errors arise in the use of this type of apparatus because the strong magnetic marks are not sufficiently localized. Thus, marks which are sufficiently strong to stand mechanically shocks and stray magnetic fields will extend from 3" to 12" in length along the cable. Because the residual flux density of successive marks may vary considerably, the placement of new magnetic marks may be in error by several inches. Such errors are cumulative and result in a calibration of cable which is valueless as a standard of accurate measurement. If weak highly localized magnetic marks were placed in lieu of strong magnetic marks, their value as a calibration of the cable would be impaired by the erasure to which they are subjected by the adverse conditions attending well operations.

Accordingly, it is an object of this invention to provide new and improved methods and apparatus for placing magnetic marks on cable or the like at calibrated intervals.

Another object of this invention is to provide new and improved methods and apparatus for creating regions of strong residual flux intensity at accurately calibrated intervals along a magnetically retentive cable or the like.

A further object of this invention is to provide such new and improved methods and apparatus whereby strong magnetic marks are rapidly and automatically placed on cable or the like at intervals calibrated without appreciable cumulative error.

These and other objects are attained, in accordance with the present invention, by placing weak, highly localized magnetic marks on a cable, wire or other magnetically retentive, elongated article at calibrated intervals to govern the placement of strong magnetic marks. A recording head and a detecting head for the weak marks are accurately spaced a calibrated distance apart along the article so that the article first passes the weak mark recording head and then the weak mark detecting head. A trigger circuit is responsive to detected weak marks to energize the recording head for placement of a new weak mark. A strong mark recording head is also spaced along the article, preferably beyond the detecting head, and is also energized when a weak mark is detected, whereby both a weak and a strong mark are recorded when a weak mark is detected. Hence, a set of strong marks is obtained with the intervals therebetween determined by the accurately calibrated intrvals between successive highly localized, weak marks. The strong marks may then serve for accurate linear measurement of the article.

In one embodiment of the invention, a strong mark recording head is spaced a distance beyond the weak mark detecting head and is energized simultaneously with the weak mark recording head each time a weak mark is detected. In another embodiment, the strong mark recording head is energized each time a fixed number of weak marks have been detected. Arrangements are provided to compensate for temperature changes and for changes in the speed at which the linear article is marked. In a further embodiment, support means are arranged for applying the heads to cable or the like as it passes, for example into or out of a well.

The invention will better be perceived from the following detailed description taken in conjunction with the accompanying drawings, in which:

FIG. 3 is a diagrammatic representation of a mounting arrangement for a marking system in accordance with yet another embodiment of the invention.

Figure 1:
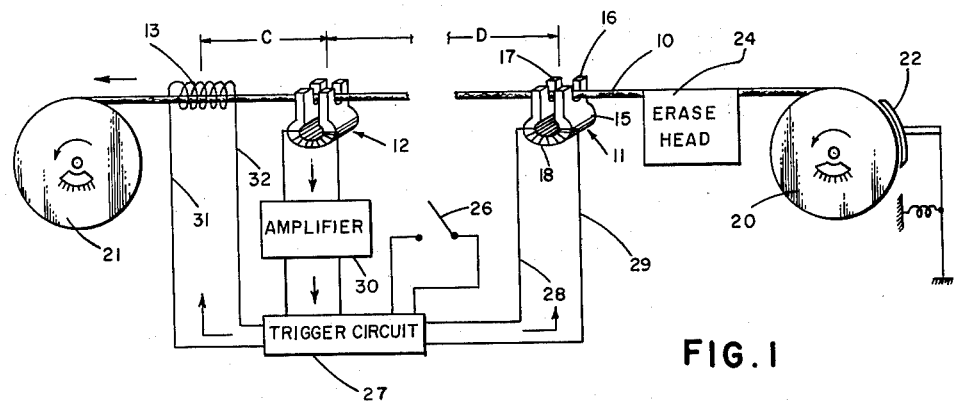
FIG. 1 is a diagrammatic representation of a marking system in accordance with one embodiment of the invention.

In FIG. 1 is shown an elongated flexible article 10 which is magnetically retentive so as to retain localized concentrations of residual flux, which may be termed magnetic marks. The article may, for example, be electric cable having an armor or sheath surrounding the conductors and composed of steel or it may be steel wire, both being commonly used in well servicing operations where accurate depth determinations are required. Where the article is referred to hereafter as a cable, it will be understood that the term is intended to embrace single-strand wires as well.

Disposed at spaced points along the length of the cable 10 are a magnetic recording head 11, a magnetic detecting head 12, and a magnetic recording head 13. The heads 11, 12 and 13 are supported in fixed relation to one another with a calibrated spacing D between the recording head 11 and the detecting head 12. A spacing C may exist between the detecting head 12 and recording head 13 which need not be accurately determined and may be substantially shorter than the spacing D. Preferably, the recording head 13 is spaced along the cable from the detector 12 in the opposite sense from recording head 11.

The recording head 11 is adapted to produce a highly localized concentration of residual flux on the cable having a sufficient intensity to be detectable by the head 12. Lengthwise of the cable 10, the residual flux density produced in the localized region increases to a maximum of one polarity, reverses sharply to a maximum of the opposite polarity and then decreases to zero, the peak-to-peak distance between the points of maximum intensity being on the order of a fraction of an inch such as, for example, one twenty-fifth of an inch. The highly localized flux concentrations produced by the recording head 11 are refered to herein as weak magnetic marks. To produce these highly localized, weak magnetic marks, the recording head 11 may suitably comprise a generally U-shaped magnetic core 15 having pole pieces 16, 17 closely spaced along the cable, such pole pieces having aligned, endwise notches for receiving the cable in a relatively close fit thereby to minimize air gaps between the pole pieces and cable. The core 15 carries a winding 18 which may, for example, have 2,000 turns, although the number of turns is suitably selected in accordance with the strength of the exciting current. The detecting head 12 may be constructed similarly to recording head 11 for response to the highly localized, weak marks.

The recording head 13, on the other hand, is adapted to produce a region of residual magnetism along the cable 10 which is relatively extensive, having a peak-to-peak dimension on the order of several inches, for example, three inches. The relatively extensive region of residual magnetism produced on the cable 10 by the recording head 13 is referred to herein as a strong magnetic mark and is seen to have a character distinctive from the weak magnetic marks produced by recording head 11. The strong mark recording head 13 may simply comprise a number of turns of conductive wire arranged to encircle the cable 10. Conveniently, the wire may be formable by hand, so that the wire may be wound about the cable manually to provide the desired number of turns. Four or five closely wound turns of wire have been found to provide adequate, strong magnetic marks when suitably energized, although the design of the strong mark recording head may be widely varied, as desired.

In accordance with the present invention, the cable 10 is moved relative to the heads and, specifically, past the weak mark recording head 11 and the detecting head 12 in succession. To avoid response of the detecting head 12 to strong magnetic marks, the cable is passed in succession from the detecting head 12 past the strong mark recording head 13. To transport the cable successively past the heads 11, 12 and 13, suitable means may be employed such as a supply drum 20 from which the cable is wound and a take-up drum 21 which is driven to receive the cable. For enhanced accuracy, the cable may be supported against sagging and may be reeled at a constant speed under a constant tension. Such tension may be imposed upon the cable by a suitable retarding means acting upon the supply drum 20, such as a spring urged brake shoe 22. An erase head 24 may be positioned along the cable between the supply drum 20 and the weak mark recording head 11 and energized from a suitable source to erase or remove any residual magnetism in the cable supplied to the recording head 11.

To place an initial weak magnetic mark on the cable, a switch 26 is connected to a trigger circuit 27 having its output connected across winding 18 of the weak mark recording head 11 via conductors 28, 29. The switch 26 is arranged to actuate the trigger circuit 27 when closed, to pass energizing current through the winding 18 for producing a weak mark on the cable 10. In order that marking of the cable 10 may thereafter be accomplished automatically without requiring intervention of an operator, the winding of the detecting head 12 is coupled to the input circuit of an amplifier 30, the output of which is coupled to the trigger circuit 27. In response to an amplified pulse signal from amplifier 30 occurring when a weak magnetic mark traverses the detecting head 12, the trigger circuit 27 not only energizes the weak mark recording head 11 but also passes energizing current through the winding of strong mark recording head 13 via conductors 31, 32. If desired, the trigger circuit 27 may be arranged to energize both of the recording heads 11 and 13 simultaneously, although the energization of these heads may be in any suitable fixed time relation.

The trigger circuit 27 and amplifier 30 may be of conventional design, the trigger circuit employing, for example, thyratrons arranged to pass relatively large currents to the recording heads when triggered.

In an operation of the measuring system of FIG. 1, the cable 10 is moved relatively to the various magnetic heads by rotating the drums 20, 21 in the direction of the arrows. A given portion of the cable is thereby moved successively past the erase head 24, the weak mark recording head 11, the weak mark detecting head 12, and the strong mark recording head 13. At the erase head, the cable is subjected to an alternating magnetomotive force which removes any residual magnetism. At a desired instant for starting the marking sequence, manual switch 26 is closed to impress an initial weak magnetic mark on the cable by actuating the trigger circuit to energize the weak mark recording head 11. The energizing current supplied by the trigger circuit to the recording head 11 is conveniently in the form of a relatively sharp D.C. pulse, the leading edge of the pulse producing a peak of residual flux of one polarity and the trailing edge, a peak of residual flux of opposite polarity. Because the gap provided by the core 15 of the recording head 11 is very short and minimizes flux fringing and because the energizing pulse is relatively sharp, the peak-to-peak distance along the cable for the weak magnetic mark is maintained at a relatively short distance on the order of a fraction of an inch.

This initial weak magnetic mark travels with the cable through the distance D between the small mark recording head 11 and the small mark detecting head 12 so as to enter the gap provided by the core of the detecting head 12. As the weak magnetic mark passes through the gap, there is induced in the winding of the detecting head a pulse having peaks of reversed polarity, which pulse is applied to the input of amplifier 30. The amplified pulse derived from amplifier 30 actuates the trigger circuit 27 to energize not only the weak mark recording head 11 but also the strong mark recording head 13. A second weak mark is accordingly applied to the cable a distance D behind the initial weak mark. At the same time, a strong magnetic mark is placed on the cable at an arbitrary distance C from the detected mark but preferably beyond the detected mark in the direction of cable motion.

The operation of the marking system is thereafter automatically responsive to passage of the cable past the recording and the detecting heads. At each instant when a small mark passes the detecting head 12, both a weak mark and a strong mark are applied to the cable. The spacing between the points of recording and detecting the weak magnetic marks thus serves as a calibrated interval for the recording of successive strong magnetic marks. Two sets of magnetic marks are thereby impressed on the cable, the marks of each set being spaced by the same equal, calibrated intervals. In the use of the cable, however, only the set of strong magnetic marks retain significance as the weak magnetic marks are subject to erasure, as by mechanical shocks and stray magnetic fields encountered in service. The strong magnetic marks, on the other hand, remain on the cable over a considerable period of time and are characterized by a sufficient residual flux that their detection is readily achieved.

The detection of the magnetic marks, it will be appreciated, is dependent upon the rate of change of residual flux at the detecting point and not merely upon the peak intensity of the flux along the cable. While the weak magnetic marks are smaller than the strong magnetic marks, both in peak flux intensity and in total flux, the weak magnetic marks may readily be detected during automatic marking of a cable. Because of the shortness of the weak magnetic marks, moreover, they may be detected at a precise point along the cable and thus may control a very rapid placement of the strong magnetic marks without appreciable cumulative errors.

Figure 2:
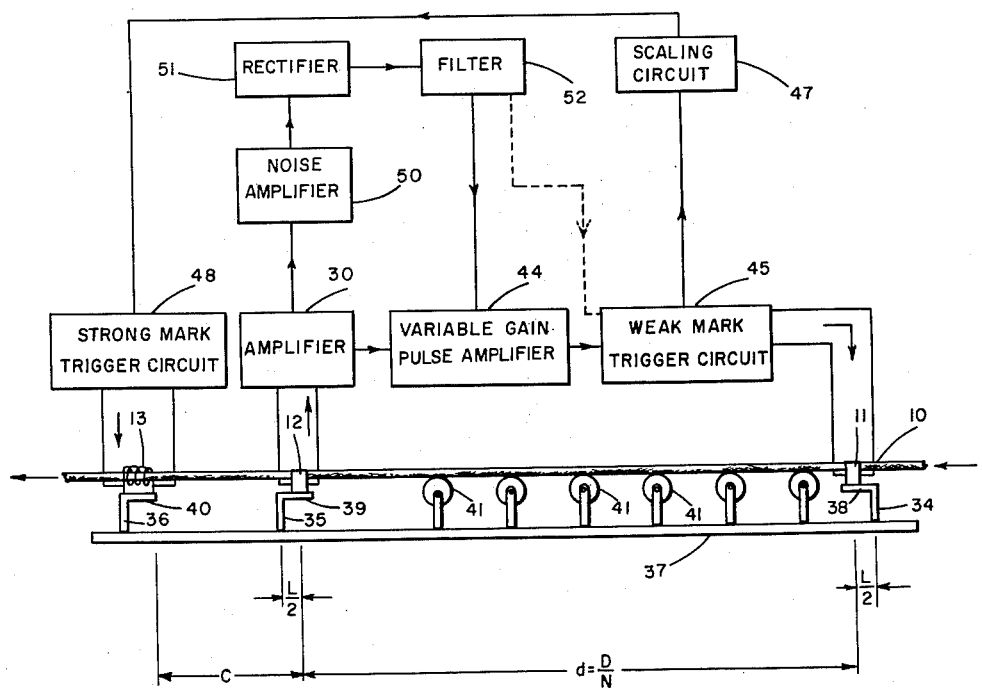
FIG. 2 is a diagrammatic representation of a marking system in accordance with another embodiment of the invention.

In FIG. 2 is shown another embodiment of the invention wherein provision is made for the use of a relatively short calibrating interval without requiring a corresponding short spacing of the strong magnetic marks. By using a shorter base, a more elaborate temperature compensation may economically be employed. Thus, as shown in FIG. 2, the magnetic heads 11, 12 and 13 are supported on respective brackets 34, 35 and 36 which are secured at fixed positions spaced along an elongated base member 37. The brackets 34 and 35 have respective arm portions 38, 39 extending parallel to the base member 37 and carrying the corresponding heads 11 and 12 at their inwardly directed free ends. Bracket 36 similarly has an arm portion 40 extending parallel to the base member 37 and carrying the magnetic head 13 near its free end which is directed similarly to the free end of arm portion 39.

To obtain a spacing D between the strong magnetic marks which are to be recorded, the small mark recording head 11 and detecting head 12 may be spaced a shorter distance $d$ which is an integral divisor of the interval D, or equal to $D/N$ where N is an integer. For enhanced accuracy, the cable 10 is supported against sagging across this span $d$ by spaced guide wheels 41 mounted, if desired, on the base member 37. To maintain the spacing $d$ constant despite temperature variations, the arm portions 38, 39 of brackets 34, 35 are designed to expand inwardly with increasing temperature by an amount exactly balancing the outward expansion of base member 37 between the points at which the brackets 34, 35 are attached. Each of the magnetic heads 11, 12 is shown to be supported inwardly of the point at which the corresponding bracket is secured to the base member and the total of these inward spacings may be taken as a distance L. While the inward spacings need not be the same, conveniently each is a distance $L/2$. The total distance between the points at which the brackets 34, 35 are secured to the base member 37 is then $d+L$. Employing a material for the base member 37 having a relatively low temperature coefficient, such as Invar, and a non-magnetic material for the brackets, such as aluminum, the inward displacement of L of the magnetic heads is selected for full temperature compensation, according to the formula:

$$\frac{d+L}{L} = \frac{\text{temperature coef. of bracket material}}{\text{temperature coef. of base member material}}$$

The inward displacement of the strong mark recording head 13 relative to the point at which the supporting bracket 36 is fixed to the base member may similarly be given a dimension which affords temperature compensation. However, since small variations in the spacing C between the detecting head 12 and the strong mark recording head 13 do not result in cumulative errors, an accurate temperature compensation for this spacing is not necessary to achievement of a high degree of accuracy.

In order that the strong magnetic marks may be spaced along the cable by the distance D which is considerably greater than the base line distance $d$, provision is made for energizing strong mark recording head 13 only after an integral number of weak marks have passed the detecting head 12 in a given recording cycle. To this end, the detecting head 12 is coupled through amplifier 30 and a variable gain amplifier 44 to a trigger circuit 45 for energizing the weak mark recording head 11. The trigger circuit 45, which may be similar to trigger circuit 27 of FIG. 1, also supplies an energizing signal to scaling circuit 47 each time that a weak mark passes the detecting head 12. The scaling circuit 47 may be of any suitable type serving to supply an actuating signal to the strong mark trigger circuit 48 only after reception of an integral number of pulses from the trigger circuit 45. Assuming that the interval D for the strong magnetic marks is 100 feet and the base line distance $d$ is 12½ feet, the scaling circuit 47 is arranged to provide an actuating pulse upon reception of every eighth energizing pulse from the trigger circuit 45.

As mentioned above, the peak amplitude of the bidirectional pulse derived from the detecting head 12 as a weak magnetic mark passes is dependent upon the rate of change of flux across the gap of the detecting head. This rate of change of flux depends, not only upon the flux density of the weak magnetic mark along the cable, but also upon the speed at which the cable traverses the detecting head. While in some applications of the marking system according to this invention, the cable may be driven at a constant speed past the magnetic heads, in other applications the cable speed may vary considerably, as would be the case in marking cable during a logging operation. Hence, it is desirable that compensation be made for speed changes in order that the trigger circuits may be operated whenever a given point of a weak magnetic mark passes the detecting head, regardless of the magnitude of the induced pulse signal. Thus, in a preferred practice, the trigger circuits are arranged for actuation at a given amplitude of the detected pulse signal as the pulse amplitude is swinging from the first to the second peak with a reversal of polarity. In accordance with the invention, the instant at which the trigger circuits are actuated is adjusted for speed compensation in accordance with the detected noise level, it being recognized that the detected noise level increases with increasing cable speed and decreases with decreasing cable speed.

To this end, the signal picked up by the detecting head 12 is supplied in amplified form by the amplifier 30 to a noise amplifier 50, which may be of a conventional high frequency type. Noise amplifier 50 may include a clipper stage, if desired, for clipping pulse peaks down to a level more nearly approaching the average noise level. From the noise amplifier 50, the noise signal is supplied through a rectifier 51 and low pass filter 52 to the gain control input of the variable gain amplifier 44. To minimize response of the variable gain amplifier 44 to the clipped and rectified pulse signals applied at the gain control input, the amplifier 44 may have a balanced variable gain stage comprising, for example, a pair of triodes having their control grids biased in accordance with the gain control signal and their plate circuits connected in balanced relation to, say, an output transformer. Hence, the variable gain amplifier 44 will faithfully amplify detected pulse signals applied to its input by the amplifier 30 and appearing in phase inverted relation upon the control grids, but its response to pulses applied to the gain control input is nullified by the balanced output.

In an exemplary operation of the marking system of FIG. 2, cable 10 is moved in succession past the magnetic heads 11, 12 and 13 at a speed which may, if desired, be variable. Assuming that a weak magnetic mark is placed on the cable in advance of the detecting head 12 in any convenient way, passage of this weak mark through the detecting head induces a bidirectional pulse in the winding of the detecting head. Let it be assumed that the pulse first rises to a positive peak, then swings to a negative peak and finally decays to zero. An amplified version of this detected pulse is supplied by amplifier 30 to the input of variable gain amplifier 44 and is therein amplified in accordance with the adjusted gain to actuate the weak mark trigger circuit 45. A weak magnetic mark is thus placed on the cable at the temperature compensated distance $d$ from the detecting head 12 and, hence, the same distance behind the initial weak mark.

At the same time that the weak mark trigger circuit energizes the weak mark recording head 11, it also energizes the scaling circuit 47 to advance one step. Assuming, however, that the scaling circuit is initially at a zero setting, no actuating signal is derived from it to trigger recording of a strong magnetic mark. As the newly recorded second magnetic mark is advanced past the detecting head 12, the third weak mark is recorded and scaling circuit 47 is advanced to its second step. This sequence continues cyclically until the eighth weak mark passes the detecting head to cause recording not only of a ninth weak mark but also of the first strong mark, assuming that the scaling circuit is set for response to the eighth step or the eighth in a succession of input pulses from the weak mark trigger circuit 45. Thereafter, as every eighth weak mark passes the detecting head 12, an additional strong mark is placed on the cable by the strong mark recording head 13. Because the base line between the weak mark recording and detecting heads 11 and 12 accurately determines each of the eight intervals intervening between recording of a strong magnetic mark, placement of the strong magnetic marks is of a corresponding high accuracy.

Triggering of the recording head occurs upon a given amplitude swing during the reversal of polarity of the detected pulses. The detected pulses, as applied to the weak mark trigger circuit 45, are adjusted to substantially the same amplitude level, irrespective of cable speed, by the action of the noise responsive gain control circuit. Thus, the cable passing the detecting head 12 has a low level of substantially random residual flux, representing noise, despite subjection to the action of the erase head 24. This low level of residual flux induces a corresponding low level noise signal in the winding of the detecting head which, when amplified by amplifier 30, may be utilized as a gain control signal varying almost linearly with cable speed. The clipping, rectification and filtering of this gain control signal results in a D.C. signal which varies with the relatively slow changes in cable speed but is substantially free of relatively high-frequency random fluctuations. A D.C. biasing signal is thus supplied to the gain control input of low frequency amplifier 44 to increase the amplification as the noise level decreases, and vice versa, whereby the output of the amplifier 44 includes detected pulses which are substantially free of peak amplitude variation with changing cable speed.

The noise signal may be derived and utilized in a variety of other ways to compensate for changes in cable speed. For example, as indicated by the dashed line in FIG. 2, the D.C. biasing signal derived from filter 52 may vary the bias of the trigger circuit thyratron to adjust the level at which the trigger circuit is actuated. In this case, the gain of amplifier 44 need not be variable. In FIG. 3 is shown apparatus in accordance with another embodiment of the invention well suited for use on offshore drilling platforms where restrictions of space make difficult the laying out of a horizontal base line. Thus, the base line is arranged vertically above a well 53 drilled through earth formations 54. In a typical application, the cable 10 is spooled off the drum 21 of a winch, under a first sheave 55 and over a second, elevated sheave 56 to descend vertically into the well and to support therein a suitable well tool 57. The cable may pass through a so-called rotary table 58 supported on a drilling platform 59 above the well. To provide a convenient base line for accurate application of magnetic marks to the cable, a base member 60 in the form of a rigid mast is pivotally supported on a base plate 61. Plate 61 rests on the rotary table 58 and is notched readily to receive the cable 10. In vertically ascending order, there are supported by the mast or base member 60 vertically above the notch in plate 61 a lower recording head 62 of the strong mark type, a lower detecting-recording head 63 of the weak mark type, an upper recording-detecting head 64 of the weak mark type, and an upper recording head 65 of the strong mark type. Associated with each of the recording-detecting heads 63, 64 are guide wheels 67 employed to maintain the heads in engagement with the cable for close inductive coupling.

The symmetrical arrangement of the magnetic heads along the base member 60 allows marking of cable while it is traveling either into or out of the well. Thus, while while the cable is traveling into the well, marking may be accomplished by connecting magnetic head 65 as an erase head, connecting head 64 as a weak mark recording head, connecting head 63 as a weak mark detecting head, and connecting head 62 as a strong mark recording head, the connections being made in either of the circuits of FIGS. 1 or 2. For marking cable coming out of the well, the functions of the corresponding upper and lower heads are reversed, as by a suitable switching arrangement.

For convenience in positioning the apparatus of FIG. 3 at the well head for a marking operation, the guide wheels 67 may be arranged to receive the cable therebetween by a lateral movement, and the strong mark recording heads 62 and 65 may be carried on binding posts 69 from which they may be detached for wrapping about the cable. The operation of the apparatus of FIG. 3 is similar to that described in connection with FIGS. 1 and 2.

If desired, the temperature compensating brackets included in the system of FIG. 2 may be employed in the other embodiments of the invention. Various modifications may be made in the circuits employed in detecting the weak magnetic marks and in recording the weak and strong magnetic marks. For example, the scaling circuit 47 of FIG. 2 may be energized directly by the variable gain amplifier 44, if desired. Furthermore, various modifications may be made in the arrangement of the magnetic heads. For example, the strong mark recording head may be placed intermediate the weak mark recording and detecting heads to minimize the length of the marking assembly, provision being made for blanking the mark detecting circuit when the strong marks pass the detecting head. Similarly, the strong mark recording head may be placed coincident with the weak mark detecting head but energized, for example, after a fixed time delay following detection of a weak magnetic mark. Or, if desired, the placement of the strong mark recording head may be a distance beyond the weak mark detecting head such that the strong marks are recorded coincident with the detected weak magnetic marks. Also, if desired, separate detecting heads spaced along the cable may be employed for energizing, respectively, the weak and strong mark recording heads.

A pattern of weak localized marks may, if desired, be recorded and detected by sets of magnetic heads spaced in a corresponding pattern, a strong mark being recorded only when all of the marks of a given pattern are simultaneously detected by the set of detecting heads. An increase in the effective signal-to-noise ratio is thereby obtained, precluding response to spurious noise peaks.

In instances where cable is to be marked as it is withdrawn from a well, a cable cleaner or line wiper is desirably employed in advance of the magnetic heads to insure intimate contact between the cable and the weak mark recording and detecting heads. Where the linear article to be marked is not readily magnetized, provision may be made for applying to the article a magnetizable material, such as a coating of iron particles in a suitable adherent carrier or suspension. The material may be applied, if desired, only along regions of the article where a mark is to be recorded, application being controlled, for example, by the detection of weak marks. Other operations may be controlled by the detection of weak magnetic marks, such as, for example, removal of magnetizable material, visible marking of the article, or application of marks detectable by other means, whereby the invention may be utilized with a wide variety of linear articles and for widely varying purposes.

As the invention is susceptible to these and other modifications, its scope is not to be restricted to the embodiments illustrated and described but is as defined in the appended claims.

I claim:

1. A method of marking an elongated article, comprising the steps of recording relatively weak magnetic marks on the article at regularly spaced intervals, detecting these weak magnetic marks and recording relatively strong magnetic marks on the article at intervals determined by the detection of said weak magnetic marks.

2. A method of marking an elongated article such as cable or the like, comprising the steps of moving the article past first and second points in succession and past a third point spaced from said first point, and placing a weak magnetic mark on the article at said first point and a strong magnetic mark on the article at said third point when a weak magnetic mark passes said second point.

3. A method of magnetically marking an elongated article such as cable or the like, comprising the steps of moving the article past first, second and third points in succession and placing a small magnetic mark on the article at said first point and a large magnetic mark on the article at said third point when a small magnetic mark passes said second point.

4. A method of magnetically marking an elongated magnetizable article such as cable or the like, comprising the steps of moving the article past first, second and third points in succession, detecting weak magnetic marks traversing said second point, recording a weak magnetic mark at said first point each time a weak magnetic mark passes said second point, and recording a strong magnetic mark on the article at said third point when a weak magnetic mark passes said second point.

5. A method of magnetically marking an elongated magnetizable article such as cable or the like, comprising the steps of moving the article past first, second and third points in succession which are spaced a fixed distance apart, detecting magnetic marks passing said second point, deriving a control signal varying with the relative speed of the article, and recording a weak magnetic mark at said first point and a strong magnetic mark at said third point at an instant timed with respect to detection of a weak magnetic mark adjustably in accordance with said control signal.

6. A method of magnetically marking an elongated magnetizable article such as cable or the like, comprising the steps of moving the article past first, second and third points in succession, detecting magnetic marks passing said second point, recording a weak magnetic mark at said first point each time a magnetic mark is detected at said second point, and recording a strong magnetic mark at the third point each time a fixed number of magnetic marks have been detected at said second point.

7. In apparatus for recording magnetic marks on an elongated magnetizable article, the combination comprising means for recording weak magnetic marks on the article at spaced intervals, means for detecting these weak magnetic marks, and means responsive to said detecting means for recording strong magnetic marks on the article at points spaced apart a distance determined by said intervals.

8. In apparatus for recording magnetic marks on an elongated magnetizable article such as cable or the like, the combination comprising means for detecting weak magnetic marks less than one-half inch in length on the article, means responsive to said detecting means for recording weak magnetic marks less than one-half inch in length on the article at spaced points therealong, and means responsive to said detecting means for recording strong magnetic marks greater than two inches in length on the article at spaced points therealong.

9. Apparatus, as defined in claim 8, wherein said weak mark recording means includes a recording head having a relatively narrow flux gap to receive said article, and said strong mark recording means includes a winding through which the article may pass.

10. In apparatus for recording magnetic marks on an elongated magnetizable article such as cable or the like, the combination comprising means for recording localized weak magnetic marks less than one-half inch in length on the article at a first point, means for detecting weak magnetic marks less than one-half inch in length on the article at a second point, means for recording strong magnetic marks greater than two inches in length on the article at a third point spaced beyond said first and second points, and means responsive to said detecting means for operating both of said recording means when a magnetic mark is detected.

11. In apparatus for recording magnetic marks on an elongated magnetizable article such as cable or the like, the combination comprising a base member, a weak mark recording head for recording magnetic marks less than one-half inch in length, a detecting head, and a strong mark recording head for recording magnetic marks greater than two inches in length, these heads being supported by said base member for successively receiving the article, means for energizing said weak mark recording head when a predetermined portion of a weak magnetic mark on the article passes said detecting head, and means for energizing said strong mark recording head at a time determined by energization of said weak mark recording head.

12. Apparatus as defined in claim 11 including means for securing at least one of said heads to said base member and extending parallel to said base member for displacing such head by thermal expansion in a direction opposite to the displacement produced by thermal expansion of said base member.

13. In apparatus for recording magnetic marks on an elongated magnetizable article such as cable or the like, the combination comprising a weak mark recording head for recording magnetic marks less than one-half inch in length, a detecting head, a strong mark recording head for recording magnetic marks greater than two inches in length, a base member for supporting at least said small mark recording head and said detecting head at a calibrated spacing, said heads being adapted to receive successive portions of the article, and means responsive to signals induced in said detecting head for energizing both said weak mark and strong mark recording heads.

14. In apparatus for recording magnetic marks on an elongated article such as a cable or the like, the combination comprising means for detecting residual magnetism on the article as the same traverses a first point, means for recording a weak magnetic mark less than one-half inch in length on the article at a second point spaced from said first point for detection by said detecting means, means for recording a strong magnetic mark greater than two inches in length on the article at a fixed point traversed by the article, means responsive to detection of a weak magnetic mark for energizing said recording means, and means responsive to the speed of the article for modifying the response of said energizing means to compensate for speed changes.

15. In apparatus for recording magnetic marks on an elongated magnetizable article, the combination comprising a first magnetic head for recording weak magnetic marks less than one-half inch in length on the article at regularly spaced intervals, a second magnetic head for detecting the residual magnetism of the article including said weak magnetic marks and random flux, a third magnetic head for recording strong magnetic marks greater than two inches in length on the article at regularly spaced intervals, means coupled with said second magnetic head for producing a control signal varying with the speed of the article relative to the head, and means coupled with said second magnetic head and responsive to said control signal for energizing said first and third magnetic heads when a prescribed portion of a weak magnetic mark is detected.

16. Apparatus as defined in claim 15 wherein said means for producing a control signal includes means for rectifying and filtering the control signal, and said energizing means includes a circuit biased by said control signal for changing the level of the pulse signal derived from said second magnetic head when a weak magnetic mark is detected.

17. In apparatus for recording magnetic marks on cable or the like, the combination comprising a pair of magnetic heads each having a magnetic core providing a relatively narrow air gap across which the cable may travel for recording and detecting weak magnetic marks on the cable, a winding having a length greater than the length of said air gaps for receiving the cable therethrough for recording strong magnetic marks on the cable, and means for supporting said magnetic heads and said winding in fixed spaced relation along the cable with said winding spaced outwardly of said magnetic heads 18. In apparatus for recording magnetic marks on cable suspended in a well, the combination comprising a pair of magnetic heads including cores for providing a relatively narrow flux gap shaped to receive the cable for recording and detecting weak magnetic marks on the cable, a pair of windings each having a length greater than the length of said air gaps for encircling the cable for recording strong magnetic marks on the cable, and means for supporting said magnetic heads and said windings in a vertically spaced array with said windings spaced on either side of said pair of magnetic heads.

19. A method of magnetically marking an elongated magnetizable article such as cable or the like, comprising the steps of moving the article past a succession of magnetic detecting and recording stations, recording a weak magnetic mark at one station when a weak magnetic mark is detected at a subsequent station, detecting the rate of change of residual flux along said article as a measure of its speed relative to said subsequent station, and adjusting the time relation of detecting and recording said weak magnetic marks in accordance with the detected rate of change of residual flux.

References Cited in the file of this patent

UNITED STATES PATENTS

| | | |
|---|---|---|
| 1,828,189 | Kiliani | Oct. 20, 1931 |
| 1,828,190 | Kiliani | Oct. 20, 1931 |
| 2,441,065 | Green | May 4, 1948 |
| 2,466,251 | Martin | Apr. 5, 1949 |
| 2,580,934 | Love et al. | Jan. 1, 1952 |
| 2,603,688 | Cole et al. | July 15, 1952 |
| 2,623,805 | Sewell | Dec. 30, 1952 |
| 2,655,633 | Minor et al. | Oct. 13, 1953 |
| 2,676,298 | Frommer | Apr. 20, 1954 |
| 2,794,951 | Broding et al. | June 4, 1957 |
| 2,855,693 | Holsten | Oct. 14, 1958 |